United States Patent [19]

Phelan

[11] Patent Number: 5,565,096
[45] Date of Patent: Oct. 15, 1996

[54] NATURAL FILTER FOR ECOLOGICAL SYSTEM

[76] Inventor: John J. Phelan, 109 Jeanette Ave., Inwood, N.Y. 11696

[21] Appl. No.: 505,678

[22] Filed: Jul. 21, 1995

[51] Int. Cl.⁶ .................................. C02F 3/10; C02F 7/00
[52] U.S. Cl. .................... 210/150; 210/170; 210/196; 210/198.1; 210/209; 210/242.2
[58] Field of Search .................................. 210/150, 151, 210/170, 198.1, 209, 221.2, 242.1, 242.2, 617, 196

[56] References Cited

U.S. PATENT DOCUMENTS

| | | | |
|---|---|---|---|
| 2,825,541 | 3/1958 | Moll et al. | 210/150 |
| 3,966,599 | 6/1976 | Burkhead | 210/151 |
| 4,030,859 | 6/1977 | Henegar | 210/242.2 |
| 4,308,137 | 12/1981 | Freeman | 210/242.2 |
| 4,690,756 | 9/1987 | Van Ry | 210/242.2 |
| 5,071,550 | 12/1991 | Bernhardt | 210/242.2 |
| 5,275,762 | 1/1994 | Burgess | 210/242.2 |
| 5,308,505 | 5/1994 | Titus et al. | 210/748 |
| 5,318,698 | 6/1994 | Bernhardt | 210/150 |
| 5,322,569 | 6/1994 | Titus et al. | 210/748 |

Primary Examiner—Peter A. Hruskoci
Assistant Examiner—Theodore M. Green
Attorney, Agent, or Firm—Richard L. Miller, P.E.

[57] ABSTRACT

A natural filter for ecological systems is provided. The apparatus includes a rock medium container for holding rocks for filtering life, means for circulating water, means for floating the apparatus, and means for supplying sunlight to the filtering life and the normally unreachable depths of water. This natural filter maintains a healthful environment for aquatic creatures by providing means to naturally circulate and cleanse the water thus encouraging biological growth and preventing the eutrophication of that body of water.

7 Claims, 1 Drawing Sheet

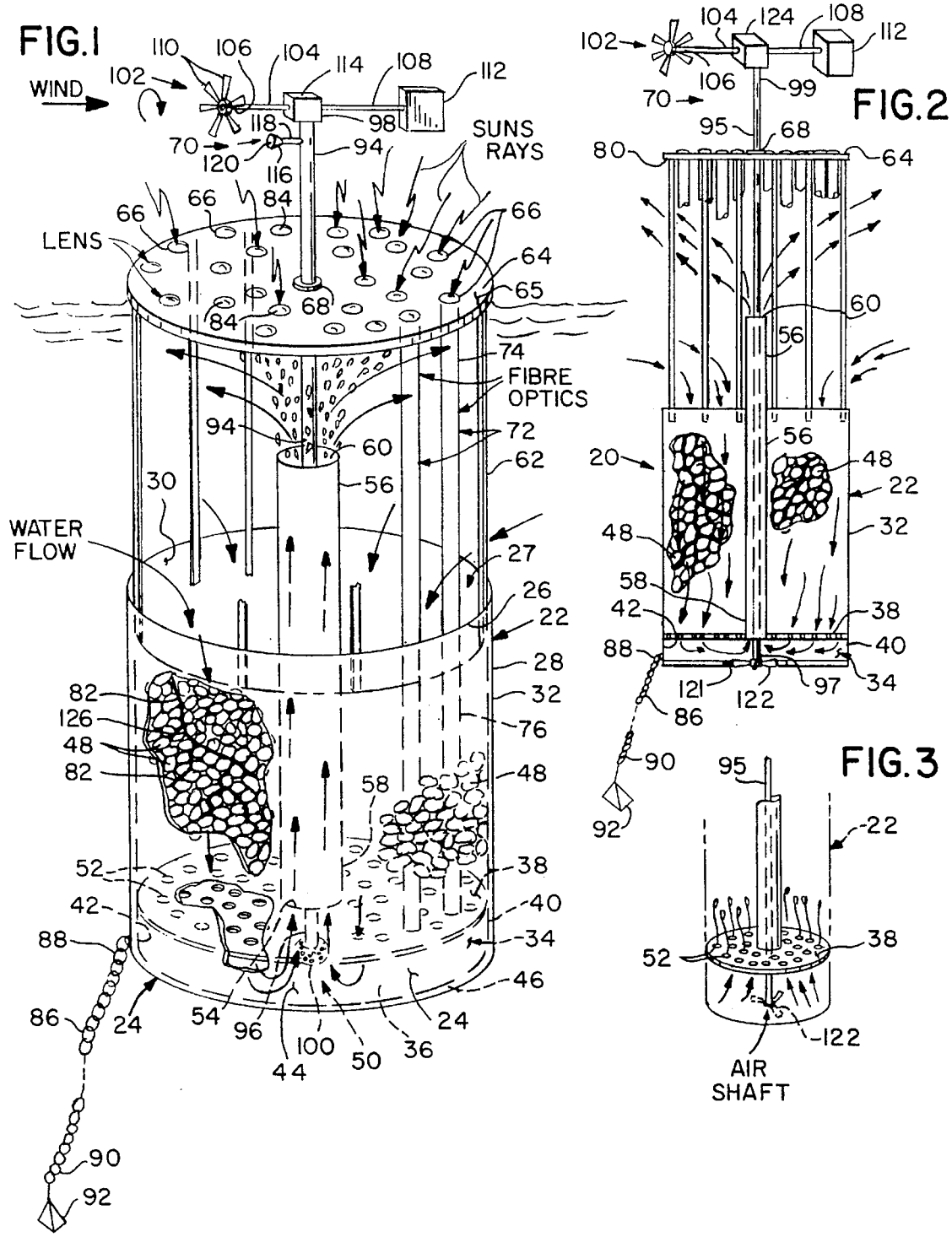

5,565,096

NATURAL FILTER FOR ECOLOGICAL SYSTEM

BACKGROUND OF THE INVENTION

The instant invention relates to filters for ecological systems and more particularly to such filters which have provisions for channeling air and sunlight into the depths of a body of water so as to clean the water, encourage biological growth, and prevent the eutrophication of that body of water,

DESCRIPTION OF RELATED ART

In some lakes during the summer, organic matter in the warm upper layer of water decays and falls into the cold layer of water below it causing the cold lower layer to become depleted of oxygen. This has had a disastrous effect on fish and other aquatic creatures that dwell in the cold lower layer.

Numerous solutions have been proposed to this problem. For example, Palmer, et al U.S. Pat. Nos. 5,104,589 and 5,176,503 disclose an aerator or destratifier to be used in small bodies of water. This destratifier is provided with a sealed flotation chamber in which a motor is completely housed. A stationary shaft runs between the top and bottom surface of the flotation chamber onto which the motor is mounted. A plurality of paddles is externally affixed to the exterior surface of the flotation chamber. A V-belt, a chain or a gearing arrangement is provided between the motor and the internal surface of the flotation chamber which enables the flotation chamber to constantly or intermittently rotate. The plurality of paddles then agitates the body of water thus allowing oxygen to be dissolved therein. Nevertheless, this device neither provides filtering of the water nor does it provide means for bringing sunlight to the normally unreachable depths of water.

Cherry U.S. Pat. No. 3,928,512 discloses a biological pond aeration device for the purpose of water or waste water treatment. This device acts to raise liquid from the lower section of a pond, then allows the liquid, by gravity, to pass over and through a channel suspended above the pond's surface. But once again, this device neither provides filtering of the water nor does it provide means for bringing sunlight to the normally unreachable depths of water.

Bernhardt U.S. Pat. 5,071,550 discloses an apparatus for cleaning and aeration of open bodies of water. This apparatus includes a floating structure partially extending above a water surface and having at least one opening in its lower region through which, water flows into the apparatus, and a fan arranged in the upper region of the floating structure for creating vacuum that enables a flow of water inside of the floating structure. An air receiving space is defined inside of the floating structure. A perforated plate which is located below a water surface established in the floating structure, limits the air receiving space from above. The air receiving space is connected with the atmosphere by a gas conducting conduit. Although this device performs a filtration of the body of water in which it floats, it does not provide means for bringing sunlight to normally unreachable depths of water.

None of these patents discloses a means for bringing sunlight to normally unreachable depths of water.

SUMMARY OF INVENTION, OBJECTS AND ADVANTAGES

It is therefore an object of the present invention to provide a natural filter for ecological systems.

Yet another object of this invention is to provide a natural filter to prevent, and even reverse the eutrophication of lakes and ponds.

Still another object of this invention is to provide an means for increasing dissolved oxygen levels and biological activity of rivers, estuaries, bays and shorelines.

A further object of this invention is to provide a filter powered by sunlight and wind and that provides a rock medium for filtering life to attach themselves to.

Further scope of applicability of the present invention will become apparent from the detailed description given hereafter. However, it should be understood that the drawings and the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagrammatic perspective view of a first embodiment of the instant invention with parts broken away;

FIG. 2 is a diagrammatic elevational view of a second embodiment of the instant invention wherein the windmill operates a propeller instead of an air pump. Some components have been removed to further show water flow in and out of the invention; and FIG. 3 is a diagrammatic partial perspective view of the lower portion of the second embodiment of the instant invention.

DESCRIPTION OF PREFERRED EMBODIMENT

Turning now descriptively to the drawings, in which similar reference characters denote similar elements throughout the several views, the natural filter for ecological systems is generally shown as numeral 20 in FIGS. 1 and 2. The natural filter for ecological systems 20 consists of a rock medium container 22 for containing the rock medium 48 and to keep it from being scattered into the surrounding water. The rock medium container 22 is a cup shaped structure. In a first embodiment, as best seen in FIG. 1, the rock medium container 22 is closed at the bottom 24 and open at the top 26. In the second embodiment, shown in FIG. 2, the bottom has a hole 121 with a propeller 122 described further on herein. Resting on the bottom 24 of the rock medium container 22 is a perforated caplike structure 34. The perforated caplike structure 34 has a rim 46 along the bottom 36. The rim 46 defines an opening 50 in the bottom 36 of the caplike structure 34. The top 38 of the caplike structure 34 has a plurality of perforations 52 for allowing circulation of water and air therethrough. The top 38 has a hole 54 in the center thereof. The perforated caplike structure 34 is disposed within the rock medium container 22 so that the rim 46 of the perforated caplike structure 34 rests on the bottom 24 of the rock medium container 22. Alternatively, a perforated structure such as a perforated plate with a hole 54 in the center thereof may be mounted within the rock medium container 22 near the bottom of the rock medium container 22. FIGS. 2 and 3 illustrate such a perforated plate mounted within the rock medium container 22 near its bottom.

A water circulation tube 56 is centrally mounted in the hole 54 in the center of the top 38 of the perforated caplike structure 34. The water circulation tube 56 extends above the opening 27 in the top 26 of the rock medium container 22. A plurality of supports 62 is fixedly attached to the inside surface 30 of the rock medium container 22. These supports 62 extend above the upper end 60 of the water circulation tube 56. A buoyant plate 64 is fixedly attached to and rests on the supports 62. The buoyant plate 64 has a number of holes 66 running therethrough and has a hole 68 centrally located therein. The buoyant plate 64 of the natural filter 20 is made of a buoyant material such as styrofoam and is selected to have such characteristics that it will provide sufficient buoyancy to maintain its upper surface 65 above the level of the water in which the natural filter 20 is floating.

A rock medium 48 is disposed within the rock medium container 22 within the region defined as above the perforated caplike structure 22 and outside the water circulation tube 56. The rock medium 48 is selected to be sufficiently light weight that the buoyant plate 64 can maintain its upper surface 65 above the surface of the water. The rocks can be natural rocks or fabricated from a synthetic material typical an elastrometric polymer or plastic.

The upper ends 74 of a number of optic fiber bundles 72, are inserted in holes 66 in the lower surface 80 of the buoyant plate 64 and extend downward therefrom. The lower ends of these bundles 72 flare outward into a spray formation 82 of optic fiber strands. Each of the strands of the spray extends downward into and permeates the rock medium 48. Preferably, each optic fiber strand of the spray formation is encapsulated in a plastic sheathing 126 so that the optic fiber strands are protected from being crushed by the rock medium 48.

A lens 84 is mounted in each hole 66 of the buoyant plate 64 for communicating optically with the fiber optic bundles 72 inserted into and extending downward from these holes 66 so that sunlight falling on the lenses 84 is concentrated before being communicated to the fiber optic bundles 72. The lens acts as a magnifying glass to concentrate the sun's light before communicating that light to the fiber optic bundle.

In order that the natural filter for ecological systems remain at a given location in the water, the bottom 24 of the rock medium container 22, is attached to a first end 88 of an anchor chain 86 and a second end 90 of the anchor chain is attached to an anchor 92.

A water circulation assembly, generally shown by arrow 70, drives water into the lower end 58 of the water circulation tube 56 and forcing the water out the upper end 60 of the tube 56.

In the first and preferred embodiment of the instant invention which is shown in FIG. 1, the water circulation assembly 70 consists of a windmill assembly 102 which pulls air into air funnel 116 and sends it down air shaft 94, and means for circulating air and water at the bottom of the air shaft 94.

The air shaft 94 is mounted within the water circulation tube 56, and has its bottom end extending through the top 38 of the perforated caplike structure 34, and has its top end 98 extending through the hole 68 centrally located in the buoyant plate 64.

The means for circulating air and water is fixedly attached to the bottom end 96 of the air shaft 94. This means consists of an air stone 100 mounted on the bottom end 96 of the air shaft 94 below the top 38 of the perforated caplike structure 34. The air stone is a highly porous material such that when an air flow is passed into it, numerous air bubbles emerge from it. Similar such air stones are sometimes used in fish tanks to provide a better aeration of the water.

The windmill assembly, generally shown as arrow 102, consists of an elongated windmill shaft 104, a plurality of windmill blades 110 mounted at the first end 106 of the shaft 104, and a vane 112 mounted at the second end 108 of the shaft. Substantially centrally located on the shaft is an air pump housing 114 having an air pump housed therein. The air pump housing 114 is fixedly mounted on the top end 98 of the air shaft 94, and is powered by the rotation of the windmill blades 110.

The air funnel 116 is fixedly mounted near the top of the air shaft 94 for receiving air and passing this air down the air shaft 94. The air funnel 116 is disposed beneath the windmill assembly 102 such that the shaft 118 of the air funnel 116 is parallel to the elongated windmill shaft 104 and extends outward from the air shaft 94 in the direction of the windmill blades 110. Thus when the wind blows, the vane 112 being turned away from the wind ensures that the windmill blades 110 will always be facing into the wind. Since the windmill assembly 102 is fixedly attached to the air shaft 94, as the windmill assembly turns, the shaft also turns and thus the air funnel opening 120 is always facing into the wind.

In a second and less preferred embodiment of the instant invention which is shown in FIG. 2, the water circulation assembly 70 consists of a windmill assembly 102 which drives means for circulating air and water at the bottom of the propeller shaft 95.

The propeller shaft 95 is mounted within the water circulation tube 56, and has its bottom end 97 extending through the top 38 of the perforated caplike structure 34, and having its top end 99 rotatably mounted in the hole 68 centrally located in the buoyant plate 64.

The mechanism for circulating water is fixedly attached to the bottom end 97 of the shaft 95. This means consists of a propeller 122 mounted on the bottom end 97 of the propeller shaft 95 below the top 38 of the perforated caplike structure 34.

The windmill assembly 102 consists of an elongated windmill shaft 104 with a plurality of windmill blades 110 mounted at the first end 106 of the shaft 104, and a vane 112 mounted at the second end 108 of the shaft. Substantially centrally located on the shaft is a gear box housing 124 having a gear box therein. The gear box housing 124 is fixedly mounted on the top end 99 of the propeller shaft 95. The gear box within the housing 124 is powered by the rotation of the windmill blades 110.

The first embodiment of the instant invention described above is preferred because using an air pump rather than a propeller to circulate the water increases dissolved oxygen levels and therefore biological activity at the lower depths of water.

FIG. 3 is a diagrammatic partial perspective view of the lower portion of the second embodiment of the instant invention.

LIST OF REFERENCE NUMBERS 20 natural filter for ecological systems
22 rock medium container
24 bottom of rock medium container
26 top of rock medium container
27 opening in the top of rock medium container
28 rounded side of rock medium container
30 inside surface of the rounded side 28

32 outside surface of the rounded side 28
34 perforated caplike structure
36 bottom of perforated caplike structure
38 top of perforated caplike structure
40 side of perforated caplike structure
42 inside surface of side 40
44 outside surface of side 40
46 rim of perforated caplike structure
48 rock medium
50 opening in the bottom of the caplike structure
52 perforation in the top of the caplike structure
54 hole in the center of the top of the perforated caplike structure
56 water circulation tube
58 lower end of water circulation tube
60 upper end of water circulation tube
62 support for buoyant plate 64
64 buoyant plate
65 upper surface of buoyant plate
66 hole in buoyant plate
68 hole centrally located in buoyant plate
70 water circulation assembly
72 optic fiber bundle
74 upper end of optic fiber bundle
76 lower end of optic fiber bundle
80 lower surface of the buoyant plate 64
82 spray formation of optic fiber strands
84 lens
86 anchor chain
88 first end of anchor chain
90 second end of anchor chain
92 anchor
94 air shaft
95 propeller shaft
96 bottom end of air shaft
97 bottom end of propeller shaft
98 top end of air shaft
99 top end of propeller shaft
100 air stone
102 windmill assembly
104 windmill shaft
106 first end of windmill shaft
108 second end of windmill shaft
110 windmill blade
112 vane
114 air pump housing
116 air funnel
118 air funnel shaft
120 air funnel opening
121 hole in bottom of rock medium container
122 propeller
124 gear box housing
126 plastic sheathing encapsulating fiber optic strand

CONCLUSION, RAMIFICATIONS, AND SCOPE OF INVENTION

From the foregoing, it will be seen that I have provided is a natural filter for ecological systems which provides water circulation, filtering of the water, and sunlight to the normally unreachable depths of water.

Thus the reader will see that my invention supplies a long felt need for a natural filter for ecological systems which is economical to make and use and which provides cleansing, sunlight, and circulation in the normally unreachable depths of water. There are many variations of this water purification apparatus which can be made by those skilled in the art without departing from the inventive concepts expressed herein. Accordingly, the scope of my invention should be determined not by the embodiments described, but by the appended claims and their legal equivalents.

The invention claimed is:

1. A natural filter for ecological systems, comprising:
   (a) a rock medium container having a bottom, a top, and a side having an inside surface and an outside surface, said container being closed near the bottom and open at the top;
   (b) a perforated structure having a bottom, and a top, said perforated structure having a plurality of perforations, said perforated structure having a hole in the center thereof, said perforated structure being mounted within the rock medium container near its bottom;
   (c) a water circulation tube having a lower end and an upper end, said tube being centrally mounted in the hole in the center of the top of the perforated structure, said water circulation tube extending above the opening in the top of the rock medium container;
   (d) a plurality of supports fixedly attached to the inside surface of the rock medium container, said supports extending above the upper end of the water circulation tube;
   (e) a buoyant plate fixedly attached to and resting on said plurality of supports, said buoyant plate having a number of holes running therethrough, said buoyant plate having a hole centrally located therein;
   (f) a windmill assembly for the driving of water into the lower end of the water circulation tube and forcing the water out the upper end of the tube;
   (g) a rock medium disposed within the rock medium container within the region defined as above the perforated structure and outside the water circulation tube; and
   (h) a plurality of optic fiber bundles, each bundle having an upper end and a lower end, the upper end of each bundle being inserted in a hole in the lower surface of the buoyant plate and extending downward therefrom, and the lower end of said bundle flaring outward into a spray formation of optic fiber strands, each of the strands of the spray extending downward into and permeating the rock medium.

2. The natural filter for ecological systems of claim 1, further comprising lenses, said lenses being in the holes of the buoyant plate, said lenses being optically connected to the fiber optic bundles inserted into and extending downward from these holes so that sunlight falling on the lenses is concentrated before being communicated to the fiber optic bundles.

3. The natural filter for ecological systems of claim 1, further comprising an anchor chain having a first end and a second end, and an anchor, the first end of the anchor chain being attached to the bottom of the rock medium container and the second end of the anchor chain being attached to the anchor.

4. The natural filter for ecological systems of claim 1, wherein the water circulation assembly comprises:
   (a) an air shaft having a bottom end and a top end, said air shaft being mounted within the water circulation tube, and having its bottom end extending through the top of the perforated structure, and having its top end extending through the hole centrally located in the buoyant plate;
   (b) means for circulating air and water fixedly attached to the bottom end of the air shaft, said means comprising an air stone mounted on the bottom end of the air shaft, said air stone being below the top of the perforated structure;

(c) a windmill assembly comprising an elongated windmill shaft having a first end and a second end, a plurality of windmill blades mounted at the first end, and a vane mounted at the second end, said windmill assembly further comprising an air pump housing having an air pump therein, said air pump housing being fixedly mounted on the top end of the air shaft, said air pump being powered by the rotation of the windmill blades; and (d) an air funnel having an air funnel shaft and an air funnel opening, said air funnel being fixedly mounted near the top of the air shaft for receiving air for passing said air down the air shaft, said air funnel being disposed beneath said windmill assembly such that the shaft of the air funnel is parallel to the elongated windmill shaft and extends outward from the air shaft in the direction of the windmill blades, so that the air funnel opening is always facing into the wind.

5. The natural filter for ecological systems of claim 1, wherein the water circulation assembly comprises:

(a) a propeller shaft having a bottom end and a top end, said propeller shaft being mounted within the water circulation tube, and having its bottom end extending through the top of the perforated structure, and having its top end extending through the hole centrally located in the buoyant plate;

(b) means for circulating air and water rotatably attached to the bottom end of the propeller shaft, said means comprising a propeller mounted on the bottom end of the air shaft, said propeller being below the top of the perforated structure;

(c) a windmill assembly comprising an elongated windmill shaft having a first end and a second end, a plurality of windmill blades mounted at the first end, and a vane mounted at the second end, said windmill assembly further comprising a gear box housing having a gear box therein, said gear box housing being fixedly mounted on the top end of the air shaft, said gear box being powered by the rotation of the windmill blades, and driving the propeller attached to the lower end of the propeller shaft.

6. The natural filter for ecological systems of claim 1, wherein each optic fiber strand of said spray formation is encapsulated in a plastic sheathing so that the optic fiber strands are protected from being crushed by the rock medium.

7. The natural filter for ecological systems of claim 1, wherein the perforated structure is a perforated cap structure having a bottom, a top, and a side having an inside surface and an outside surface, said perforated cap structure having a rim along the bottom, said rim defining an opening in the bottom, said top having a plurality of perforations, said top having a hole in the center thereof, said perforated cap structure being disposed within the rock medium container so that said rim of said perforated cap structure rests on the bottom of the rock medium container.

* * * * *